(12) United States Patent
Umnov

(10) Patent No.: US 8,498,502 B2
(45) Date of Patent: Jul. 30, 2013

(54) DEVICE FOR PHASE MODULATION

(75) Inventor: Alexander Umnov, Sachse, TX (US)

(73) Assignee: Fujitsu Limited, Kawasaki-shi (JP)

( * ) Notice: Subject to any disclaimer, the term of this patent is extended or adjusted under 35 U.S.C. 154(b) by 300 days.

(21) Appl. No.: 12/971,523

(22) Filed: Dec. 17, 2010

(65) Prior Publication Data
US 2012/0155796 A1 Jun. 21, 2012

(51) Int. Cl.
*G02F 1/035* (2006.01)
(52) U.S. Cl.
USPC .................................. 385/3; 385/1; 385/4
(58) Field of Classification Search
USPC .................................. 385/1, 2, 3, 4
See application file for complete search history.

(56) References Cited

U.S. PATENT DOCUMENTS

| 5,029,978 A | 7/1991 | Curtis et al. | 350/96.29 |
|---|---|---|---|
| 5,115,335 A | 5/1992 | Soref | 559/248 |
| 5,253,099 A | 10/1993 | Heidemann | 359/260 |
| 5,822,471 A | 10/1998 | McGinnis | 385/1 |
| 6,512,860 B2 | 1/2003 | Bischoff et al. | 385/2 |
| 6,657,769 B2 | 12/2003 | Hayes et al. | 359/279 |
| 6,819,463 B2 | 11/2004 | Noonan | 359/245 |
| 7,272,270 B2 | 9/2007 | Nakada et al. | 385/2 |
| 7,657,190 B2 | 2/2010 | Akiyama | 398/195 |
| 7,693,355 B2 * | 4/2010 | Peyghambarian et al. | 385/2 |
| 7,912,327 B2 * | 3/2011 | DeRose et al. | 385/2 |

* cited by examiner

*Primary Examiner* — Jennifer Doan
(74) *Attorney, Agent, or Firm* — Baker Botts L.L.P.

(57) ABSTRACT

A phase modulator may include a middle layer having a first refractive index, a first surrounding layer of material in contact with the middle layer and having a second refractive index, a second surrounding layer of material in contact with the middle layer and may having a third refractive index, a first electrode in electrical contact with the first surrounding layer, and a second electrode may be in electrical contact with the second surrounding layer. When no voltage is applied across the first electrode and the second electrode, the first refractive index may be greater than the second refractive index and the third refractive index. When a voltage is applied across the first electrode and the second electrode, the first refractive index may be less than the second refractive index within a portion of the phase modulator substantially within an electric field induced by such voltage.

8 Claims, 2 Drawing Sheets

DEVICE FOR PHASE MODULATION

TECHNICAL FIELD OF THE INVENTION

The present invention relates generally to optical networks and, more particularly, to a device for phase modulation in an optical network.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss.

Optical networks often employ modulation. In general, modulation is the process of varying one or more properties (e.g., amplitude, phase, and/or frequency) of a particular periodic waveform (usually a high-frequency waveform), called the carrier signal, with respect to a modulating signal. Thus, modulation may allow optical networks to convey a message signal (for example a digital bit stream or an analog audio signal), inside another signal that can be physically transmitted (e.g., an optical carrier signal propagating through an optical fiber).

A type of modulation often used in optical networks is phase modulation. Phase modulation is a form of modulation that represents information as variations in the instantaneous phase of a carrier wave. A commonly-used phase modulator in optical networks is a Mach-Zehnder Modulator (MZM). In an MZM, a input beam of light may be split evenly between two matched arms of optical fiber, and then recombined into an output beam of light. Each arm may be proximate to a corresponding pair of electrodes, such that when a voltage is applied to an arm's corresponding pair of electrodes, the refractive index of the optical fiber of the matching arms varies, thus varying the speed light through the waveguide. Based on the voltage applied to each pair of electrodes, the output beam of light may be a phase or amplitude modulated version of the input beam (e.g., a voltage applied to both pairs of electrodes may induce a half-wave phase delay on the beam). Based on their phase shifting characteristics, MZMs may be used in a variety of phase modulation schemes, include binary phase-shift keying (BPSK), quadrature phase-shift keying (QPSK), dual-polarization QPSK, and other formats. As phase modulation schemes increase in complexity, the number of MZMs required increases. Due to cost and expense associated with MZMs, a less expensive alternative may be desirable.

SUMMARY

In accordance with embodiments of the present disclosure, a phase modulator may include a middle layer having a first refractive index, a first surrounding layer of material in contact with the middle layer and having a second refractive index, a second surrounding layer of material in contact with the middle layer and may having a third refractive index, a first electrode in electrical contact with the first surrounding layer, and a second electrode may be in electrical contact with the second surrounding layer. When no voltage is applied across the first electrode and the second electrode, the first refractive index may be greater than the second refractive index and the third refractive index. When a voltage is applied across the first electrode and the second electrode, the first refractive index may be less than the second refractive index within a portion of the phase modulator substantially within an electric field induced by such voltage.

Technical advantages of one or more embodiments of the present invention may include a phase modulator employing a waveguide as an alternative to a Mach-Zehnder-based phase modulator.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
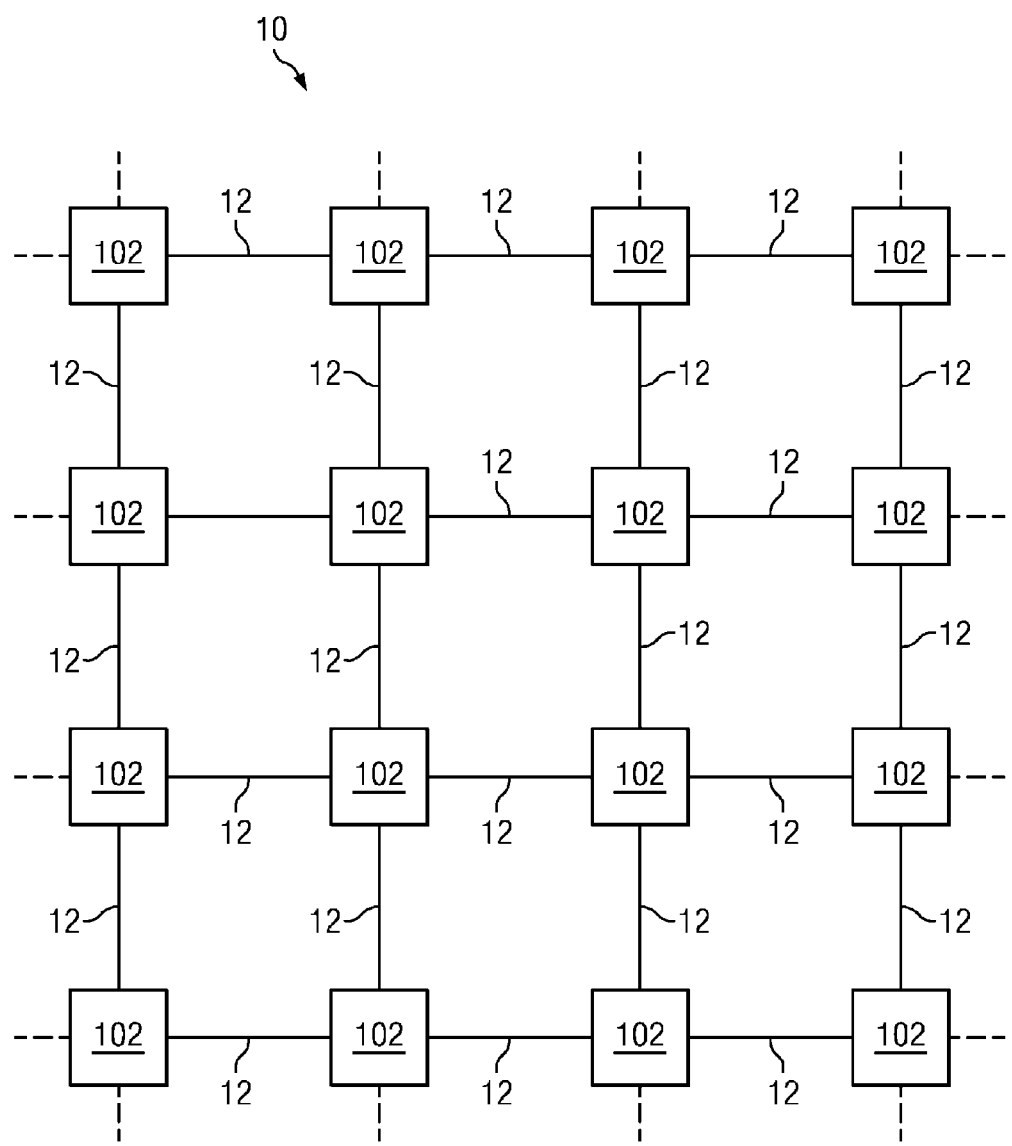
FIG. 1 illustrates a block diagram of an example network, in accordance with embodiments of the present disclosure.
Figure 2:
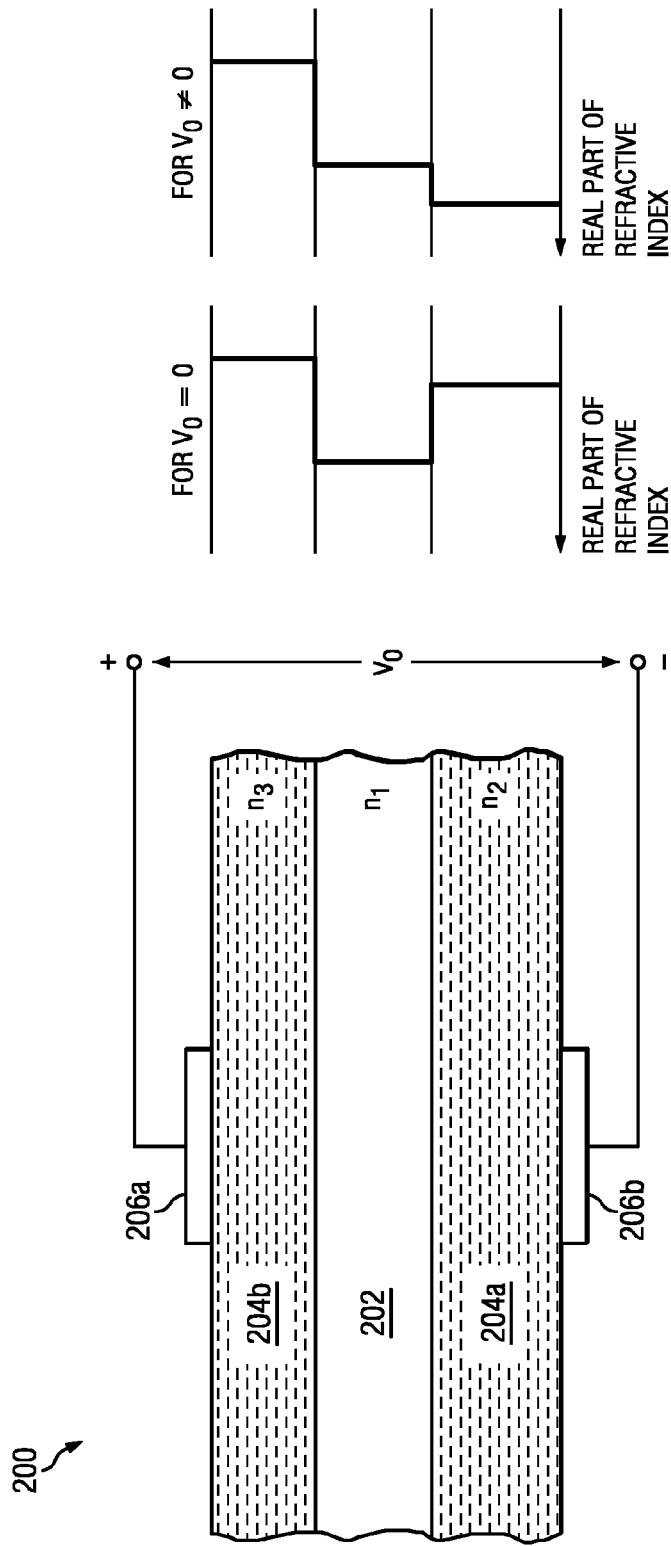
FIG. 2 illustrates an example phase modulator, in accordance with embodiments of the present disclosure.

Embodiments of the present invention and its advantages are best understood by referring to FIGS. 1 and 2, like numerals being used for like and corresponding parts of the various drawings.

FIG. 1 illustrates a block diagram of an example network 10, in accordance with certain embodiments of the present disclosure. In certain embodiments, network 10 may be an optical network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes to create a mesh. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple network elements 102 to each other and communicate information between corresponding network elements 102. For example, a transmission medium 12 may include an optical fiber, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. As used herein, the term "packet" will be used to generally referred to any data structure used to convey traffic, including without limitation a packet, a frame, an unstructured bit stream, or any other suitable data structure.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. In certain embodiments, network element 102 may comprise a switch or router configured to route data received by network element 102 to another device (e.g., another network element 102) coupled to network element 102.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

As previously mentioned, communication networks often employ phase modulation, and for that purpose, employ phase modulators. For example, in network 10, one or more of network elements 102 may include a phase modulator. FIG. 2 illustrates an example phase modulator 200, in accordance with embodiments of the present disclosure. As depicted in FIG. 2, phase modulator 200 may be constructed as a waveguide (e.g., a dielectric slab waveguide, strip waveguide, optical fiber, etc.), with three substantially parallel layers of materials with different dielectric constants including a middle layer 202 having a material with an index of refraction $n_1$, and surrounding layers 204a and 204b each in contact with middle layer 202 and having a material or materials with index of refractions $n_2$ and $n_3$, respectively. Phase modulator 200 may also include two electrodes 206a and 206b, such that one electrode 206a is in electrical contact with a surrounding layer 204a and the other electrode 206b is in electrical contact with a surrounding layer 204b.

Materials comprising layers 202, 204a, and 204b may be selected such that a beam of electromagnetic energy (e.g., laser light) directed into waveguide 200 may substantially confined in middle layer 202 by total internal reflection. In addition, as depicted in the right-hand side of FIG. 2, materials comprising layers 202, 204a, and 204b may be selected such that when no voltage $v_0$ is applied across electrodes 206a and 206b, $n_1>n_2$ and $n_1>n_3$, and when a voltage $v_0$ is applied across electrodes 206 and 206b (thus producing an electric field between across waveguide 200 in the proximity of electrodes 206a and 206b), $n_1<n_2$ in the portions of middle later 202 and surrounding layer 204b substantially within the electric field.

In operation, a beam of electromagnetic energy (e.g., laser light) may be directed into phase modulator 200 and may internally reflect multiple times between the boundary delineating middle layer 202 and surrounding layer 204a and the boundary delineating middle layer 202 and surrounding layer 204b. When a voltage $v_0$ is applied across electrodes 206a and 206b, one of such internal reflections at the boundary delineating middle layer 202 and surrounding layer 204a may occur substantially within the electric field produced between electrodes 206a and 206b. Due to the change to index of refraction $n_2$ or $n_1$ induced by the presence of the electric field such that $n_1<n_2$ at the point of such reflection, and the beam of electromagnetic energy may be phase shifted one half wavelength. In some embodiments, such phase shift may only occur for s-polarized optical electromagnetic energy.

In some embodiments, to ensure that only one internal reflection of a beam of electromagnetic energy occurs at the boundary delineating middle layer 202 and surrounding layer 206b in the portion of waveguide 200 within the electric field induced between electrodes 206a and 206b (when present), one or both electrodes 206a/206b may be appropriately sized (e.g., have a particular length) such that only one internal reflection occurs at the boundary delineating middle layer 202 and surrounding layer 206a in the portion of waveguide 200 substantially within the electric field induced between electrodes 206a and 206b.

Although surrounding layers 204a and 204b are depicted in FIG. 2 as having indices of refraction $n_2$ and $n_3$, such that $n_2 \neq n_3$, some embodiments of phase modulator 200 may be constructed such that $n_2$ and $n_3$ are approximately equal.

A component of system network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the disclosure. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:
1. A phase modulator, comprising:
a middle layer of material having a first refractive index;
a first surrounding layer of material in contact with the middle layer having a second refractive index;
a second surrounding layer of material in contact with the middle layer having a third refractive index;
a first electrode in electrical contact with the first surrounding layer; and
a second electrode in electrical contact with the second surrounding layer;

the middle layer, the first surrounding layer, the second surrounding layer, the first electrode, and the second electrode arranged such that a beam of electromagnetic energy injected into the phase modulator is internally reflected at the boundary delineating the middle layer and the first surrounding layer within the portion of the phase modulator substantially within the electric field, wherein:

when no voltage is applied across the first electrode and the second electrode, the first refractive index is greater than the second refractive index and the third refractive index; and when a voltage is applied across the first electrode and the second electrode, the first refractive index is less than the second refractive index within a portion of the phase modulator substantially within an electric field induced by such voltage.

2. A phase modulator in accordance with claim 1, the reflection occurring at the boundary delineating the middle layer and the first surrounding layer within the portion of the phase modulator substantially within the electric field causing the beam of electromagnetic energy to be phase shifted by one half wavelength.

3. A phase modulator in accordance with claim 1, the first electrode and the second electrode sized such that only one internal reflection occurs at the boundary delineating the middle layer and the first surrounding layer within the portion of the phase modulator substantially within the electric field.

4. A phase modulator in accordance with claim 1, wherein the third refractive index is approximately equal to the second refractive index when no voltage is applied across the first electrode and the second electrode.

5. A method for phase modulation, comprising:
providing a middle layer of material having a first refractive index;
providing a first surrounding layer of material in contact with the middle layer having a second refractive index;
providing a second surrounding layer of material in contact with the middle layer having a third refractive index;
providing a first electrode in electrical contact with the first surrounding layer;
providing a second electrode in electrical contact with the second surrounding layer; and
arranging the middle layer, the first surrounding layer, the second surrounding layer, the first electrode, and the second electrode such that a beam of electromagnetic energy injected into the phase modulator of light is internally reflected at the boundary delineating the middle layer and the first surrounding layer within the portion of the phase modulator substantially within the electric field,
wherein:

when no voltage is applied across the first electrode and the second electrode, the first refractive index is greater than the second refractive index and the third refractive index; and when a voltage is applied across the first electrode and the second electrode, the first refractive index is less than the second refractive index within a portion of the phase modulator substantially within an electric field induced by such voltage.

6. A method in accordance with claim 5, the reflection occurring at the boundary delineating the middle layer and the first surrounding layer within the portion of the phase modulator substantially within the electric field causing the beam of electromagnetic energy to be phase shifted by one half wavelength.

7. A method in accordance with claim 5, further comprising sizing the first electrode and the second electrode sized such that only one internal reflection occurs at the boundary delineating the middle layer and the first surrounding layer within the portion of the phase modulator substantially within the electric field.

8. A method in accordance with claim 5, wherein the third refractive index is approximately equal to the second refractive index when no voltage is applied across the first electrode and the second electrode.

* * * * *